United States Patent [19]

Sandau

[11] 4,164,242
[45] Aug. 14, 1979

[54] VALVE FOR A PRESSURE TANK

[75] Inventor: Hartmut Sandau, Möglingen, Fed. Rep. of Germany

[73] Assignee: Robert Bosch GmbH, Stuttgart, Fed. Rep. of Germany

[21] Appl. No.: 891,858

[22] Filed: Mar. 30, 1978

[30] Foreign Application Priority Data

Apr. 6, 1977 [DE] Fed. Rep. of Germany ....... 2715424

[51] Int. Cl.² .............................................. F16L 55/04
[52] U.S. Cl. ..................................... 138/30; 138/131
[58] Field of Search .................. 138/30, 31; 137/514.7, 137/514.5

[56] References Cited

U.S. PATENT DOCUMENTS

| | | | |
|---|---|---|---|
| 3,142,473 | 7/1964 | Mercier | 137/514.7 |
| 4,067,360 | 1/1978 | Zirps | 138/30 |

*Primary Examiner*—Willis Little
*Attorney, Agent, or Firm*—Michael J. Striker

[57] ABSTRACT

A pressure tank includes a hollow container which has an outlet for discharging fluid therefrom. The outlet is provided with a valve seat, for receiving a valve member which is slidably mounted in the container above the valve seat for respective movement between an open position, so that fluid in the container can flow therefrom through the outlet and a closed position so as to prevent discharging of fluid out of the container. A flexible partition is provided in the container, subdividing the interior thereof into a gas-containing compartment and into a liquid-containing compartment. The partition is displaceable on expansion of gas in the gas compartment, into an extended position immediately adjacent the outlet. An element is connected to the valve member, which element cooperates with the partition in the extended position of the same so as to prevent premature movement of the valve member into the closed position until the container is empty.

5 Claims, 1 Drawing Figure

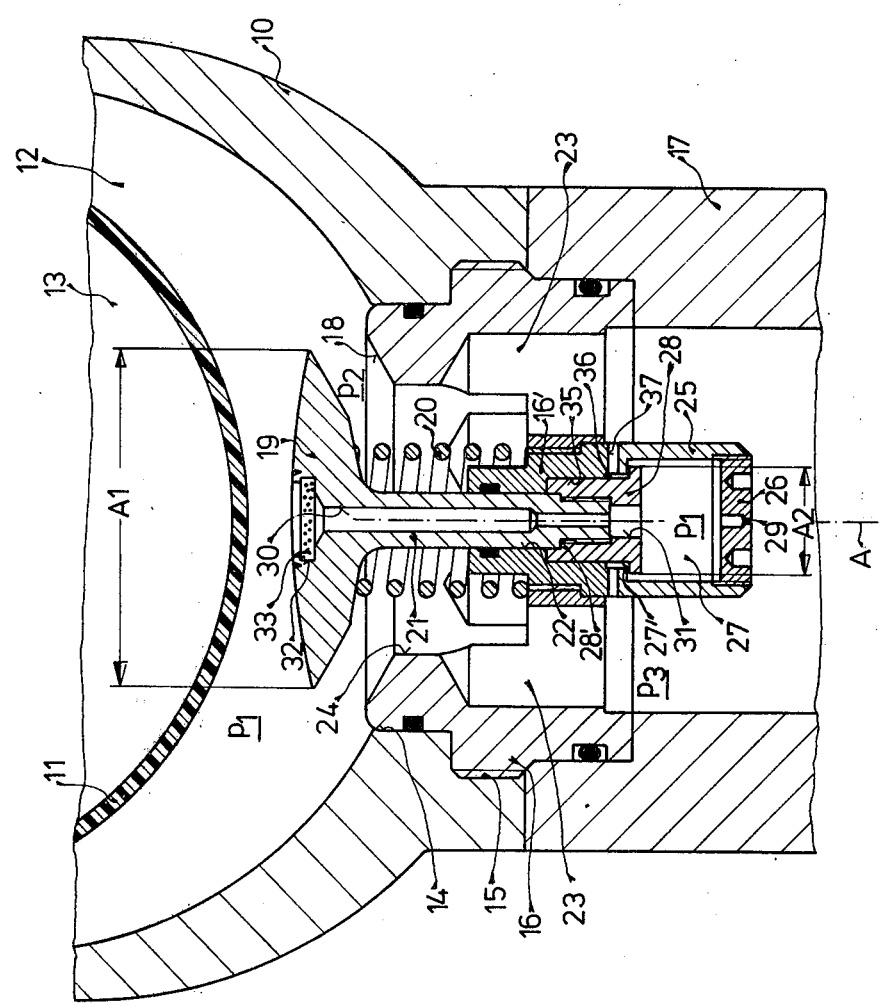

VALVE FOR A PRESSURE TANK

BACKGROUND OF THE INVENTION

This invention relates to a valve used in connection with a pressure tank which serves as an energy reservoir, pressure accumulator or shock absorber in hydraulic equipment.

Conventionally such a pressure tank is pressurized or depressurized via a connecting nipple arranged on the tank. The connecting nipple has a valve member, which is provided to alternatively permit or prevent flow of fluid from the tank. A drawback of these prior-art structures is that their valves tend to close prematurely, thereby blocking the passage for discharge of the fluid before the tank is empty. This feature becomes especially disadvantageous when such an arrangement is used in very accurate fluid-pressure systems, when it is very important to be certain that the tank is fully emptied.

SUMMARY OF THE INVENTION

It is an object of the present invention to overcome the disadvantages of the prior art arrangements.

More particularly, it is an object of the invention to provide a relatively inexpensive arrangement of the type under discussion in which premature valve closure is reliably eliminated.

Pursuant to these objects, and others which will become apparent hereafter, a pressure tank is provided with a hollow container which has a first outlet for discharging fluid therefrom. The outlet is provided with a valve seat. A valve member is slidably mounted in the container above the valve seat for respective movement between an open position in which fluid is permitted to discharge through the outlet, and a closed position to thereby prevent fluid from discharging out of the container. The valve member is provided with a portion facing towards and corresponding to the valve seat, and operative for fittingly engaging the valve seat when the valve member is in the closed position.

The arrangement preferably further comprises resilient means, usually a spring, for urging the valve member into the open position.

According to a further concept of the present invention the container is provided with a flexible partition, which subdivides the interior of the container into a gas-containing compartment and a liquid-containing compartment. The partition is displaceable on expansion of gas in the gas compartment into an extended position in which it becomes located immediately adjacent to the outlet.

One of the main advantageous features of the present invention is that means are connected to the valve member, which means communicate with the partition only in the extended position of the same and serve to prevent movement of the valve member into the closed position until the container is empty.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a sectional view of a pressure tank embodying the present invention.

DESCRIPTION OF A PREFERRED EMBODIMENT

Referring now to the drawing it may be seen that the reference numeral 10 designates a rigid metal container, which has an elastic (e.g., rubber) partition or diaphragm 11 which divides the container 10 into a liquid-containing compartment 12 and a gas-containing compartment 13.

The container 10 in its lower part is provided with a hole 14, provided with a threaded portion 15 for receiving therein a valve housing 16. The valve housing 16 and the housing 10 are connected to a discharge conduit 17, which communicates with a hydraulic device (not shown).

A flange of the housing 16 is shaped with a valve seat 18, which corresponds and engages with a lower portion of a plate-shaped valve member 19, when the latter is in a closed position, so as to prevent discharging fluid from the liquid compartment 12 of the container 10, when the latter is empty. The spring 20 urges the valve member 19 upwardly into an open position, to thereby permit discharging fluid from the container 10, when the latter is filled. A tubular cylindrical stem 21 of the plate-shaped valve member 19 is tightly received in the opening 22 of a sleeve 16', which is axially slidable along an axis A in an opening 23 provided in the housing 16.

The sleeve 16' has an axial prolongation 25 formed as a barrel, which is closed from below by a cover 26. The barrel 25 is provided with a piston 28 having a piston rod 28' which is fastened (threaded) on the lower portion of the stem 21. The cover 26 defines in the barrel 25 a first pressure-chamber 27, which is bounded from thereabove by a lower portion of the piston 28. A diameter of the piston 28 is $A_2$, which is substantially smaller than the diameter of the plate-shaped valve member $A_1$. There is a choke bore 29 in the cover 26 for connecting the pressure chamber 27 with a discharge conduit 17. The stem 21 is provided with a longitudinal throughout bore 30, which is coaxial and communicates with a bore 31 provided through the piston 28 and the piston rod 28', so that a direct throughout passage exists between the liquid compartment 12 through bores 30, 31, chamber 27 and choke bore 29 subsequently with the interior of the discharge conduit 17. The longitudinal bore 30 is enlarged at its upper portion in the valve member 19, for receiving therein a sinter stainless steel plate 33.

The sleeve 16' which has a hole 35 for receiving herein the piston rod 28', also has at its lower portion a plurality of radial holes 37 extending towards the outside of the opening 23. The barrel 25 has a trailing end which provided with a hole for extension therethrough of the piston rod 28. The outer wall of the piston rod 28 is spaced from the inner wall of the trailing end of the barrel 25, so as to define a space therebetween to permit flow of fluid come into this space through the holes 37. From below this space is limited by an upper surface 27' of this piston 28, thereby defining a second pressure chamber 36 which communicates with the interior of the opening 23.

When the container 10 is filled, the dividing wall 11 is more or less compressed, so that the valve member 19 is open, as it is shown in the FIGURE.

Pressure medium can then run through the sintered stainless steel plate 33 and bores 30 and 31 into the first pressure chamber 27. The choke 29 is controlled in such a manner that, as much pressure medium runs into the chamber 27 exactly the same amount of medium runs out from the chamber 27 through the choke 29 so that pressure within the chamber 27 is always equal to pressure $P_1$, which exists in the liquid compartment, particularly above the valve member 19.

When the pressure medium passes throughout the gap between the valve member 19 and the valve seat 18, and in the interior of the opening 23 pressure $P_3$ exists, which due to the increasing flow velocity of the discharging pressure medium is smaller than that in the liquid compartment 12, that is $P_1$. The pressure $P_3$ tramsmits through the radial holes 37 into the second chamber 36, therefore subjecting the piston 28 to a pressure difference $P_1 - P_3$. The force generated due to this pressure difference assures that the valve member remains in its open position, and the spring 20 also exerts an auxiliary force.

When the pressure medium runs out of the container 10, the pressure in the gap between the valve member 19 and the valve seat 18 drops to $P_2$, which is lower than $P_1$ due to the effect created by the increased flow velocity of the outflowing medium. If no specific steps were taken to prevent this, the valve member would prematurely close the gap due to the drop in pressure in this area. This effect is, however, eliminated in the present invention by the construction described above.

When the liquid compartment 12 empties, the dividing wall 11 extends and abuts against the plate-shaped valve member simultaneously closing the sintered stainless steel plate 33, so as to prevent discharging fluid through the bores 30 and 31 into the chamber 27. When the chamber 27 empties the valve member 19 can close the valve, by engaging the valve seat 18. By that time the liquid compartment is empty.

It will be understood that each of the elements described above, or two or more together, may also find a useful application in other types of a pressure tank differing from the type described above.

While the invention has been illustrated and described as embodied in a pressure tank, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure device, comprising a hollow container having an outlet for discharging fluid therefrom, said outlet being provided with a valve seat; a valve member slidably mounted in said container above said valve seat for respective movement between an open position to thereby permit fluid to discharge through said outlet and a closed position to thereby prevent fluid from discharging out of the container, said valve member being provided with a portion facing towards and corresponding to said valve seat and operative for fittingly engaging said valve seat when the valve member is in said closed position; resilient means for urging the valve member into said open position; a flexible partition in said container subdividing an interior thereof into a gas-containing compartment and into a liquid-containing compartment at said outlet, said partition being displaceable on expansion of gas in said gas compartment into an extended position immediately adjacent said outlet; and means connected to said valve member for preventing movement of the same into said closed position until the container is empty, and including a stationary barrel having one open end communicating with said liquid-containing compartment only when the container is substantially full and another open end for predetermined discharge of fluid from said barrel, said one open end becoming closed by said partition only in said extended position of the latter so as to prevent any communication between said barrel and said liquid-containing compartment, so that said valve member closes said outlet only when the fluid discharges from said barrel through said other open end.

2. A device defined in claim 1, wherein said valve member is provided with a stem formed with a throughgoing bore having a first open end communicating with the interior of the container and a second open end, said barrel being fixedly mounted in said container and having a piston slidably mounted therein and provided with a piston rod extended out from said barrel and fixedly connected to said stem for corresponding movement therewith, said piston with said piston rod having a throughgoing hole coaxial with said bore and communicating with said second open end of said bore, said barrel being provided with said other open end communicating with an exterior of said container to thereby provide a direct passage of fluid from the interior of the container throughout said barrel and said other open end into the exterior of said container.

3. A device defined in claim 2, wherein said piston has a lower portion facing said other open end and an upper portion facing said stem, said barrel having a leading end closed by a closing element provided with said other open end and defining with said lower portion of the piston a first pressure chamber, so that the pressure in said first chamber is equal to the pressure in the liquid-containing compartment of the container, so long as said bore is not closed from thereabove by said partition when the latter is in said extended position.

4. A device defined in claim 3, wherein said barrel has a trailing end superposed above said upper portion of said piston and having a hole for receiving said piston rod therein so as that an outer wall of the piston rod inwardly spaced from an internal wall of said hole to thereby define a second pressure chamber communicating with the exterior of the container, so that the piston is subjected to a pressure difference of pressure in the first pressure chamber below the piston so as to urge said piston upwardly towards said open position of the valve member and pressure in the second pressure chamber urging said piston downwardly towards said closed position of the valve chamber.

5. A pressure device, comprising a hollow container having an outlet for discharging fluid therefrom, said outlet being provided with a valve seat; a flexible partition in said container subdividing an interior thereof into a gas-containing compartment and into a liquid-containing compartment containing fluid therein under a first pressure, said partition being displaceable on expansion of gas in said gas compartment into an extended position immediately adjacent said outlet; a valve member slidably mounted in said container above said valve seat for resepective movement between an open position to thereby permit fluid to discharge through said outlet and a closed position to thereby prevent fluid from discharging out of the container, said valve member being provided with a portion facing towards and corresponding to said valve seat and operative for fittingly engaging said valve seat when the valve member is in said closed position, the fluid passing through said outlet under a second pressure smaller than that in said liquid-containing compartment, said valve member tending to move to its closed position so as to prematurely close said outlet when said container is not empty; and means connected to said valve member for preventing movement of said valve member into said closed position until the container is empty and including a barrel having one open end communicating with said liquid containing compartment so as to permit fluid flow from the same into an interior of the barrel and another open end for the controlled discharge of fluid from said barrel so as to keep the fluid in the interior of the barrel under a third pressure substantially equal to said first pressure to thereby prevent said valve member from movement into said closed position thereof, said one open end becoming closed by said partition only in said extended position thereof so that further fluid flow into said barrel is then prevented and said third pressure decreases thereafter as the fluid discharges from said barrel until the third pressure becomes sufficiently small to permit said valve member to close said outlet.

* * * * *